(12) United States Patent
Cornett et al.

(10) Patent No.: US 7,730,776 B2
(45) Date of Patent: Jun. 8, 2010

(54) VECTOR WIND SENSOR AND INTEGRATED ANTENNA

(75) Inventors: Alan Cornett, Andover, MN (US); Robert Charles Becker, Eden Prairie, MN (US); Jerome Paul Drexler, Wyoming, MN (US)

(73) Assignee: Honeywell International Inc., Morristown, NJ (US)

( * ) Notice: Subject to any disclaimer, the term of this patent is extended or adjusted under 35 U.S.C. 154(b) by 3 days.

(21) Appl. No.: 12/144,519

(22) Filed: Jun. 23, 2008

(65) Prior Publication Data

US 2009/0314078 A1    Dec. 24, 2009

(51) Int. Cl.
*G01P 5/00* (2006.01)
(52) U.S. Cl. .................... 73/170.01; 73/170.11
(58) Field of Classification Search ............ 73/170.11, 73/170.01, 170.07
See application file for complete search history.

(56) References Cited

U.S. PATENT DOCUMENTS

| 5,117,687 | A | 6/1992 | Gerardi |
| 6,370,949 | B1 | 4/2002 | Zysko et al. |
| 7,117,735 | B2 | 10/2006 | Shoemaker et al. |
| 7,268,691 | B2 | 9/2007 | Koors et al. |

*Primary Examiner*—Andre J Allen
(74) *Attorney, Agent, or Firm*—Fogg & Powers LLC

(57) ABSTRACT

An anemometer assembly for sensing and transmitting wind speed and wind direction data. The wind sensor measures relative wind direction and wind speed without the use of moving parts and consumes very little power making it suitable for unattended operation. The main wind sensing member is an elongated vertical member that can be used as radio antenna. The data can be transmitted from a remote location and thus relay data to a central collection repository or network location.

15 Claims, 4 Drawing Sheets

VECTOR WIND SENSOR AND INTEGRATED ANTENNA

BACKGROUND OF THE INVENTION

Anemometers are primarily used to measure air flow and commonly comprise a rotating element whose angular speed of rotation is correlated with the linear velocity of the air flow. Cup and vane anemometers are by far the most prevalent. The cups typically spread over 120 degree angles, attached at a central hub. The center of the hub translates rotational movement along a vertical axis when the cups respond to air movement in the horizontal plane. The rotational movement relates to the speed of the impinging air currents and thus to wind speed. One of the drawbacks of this type of anemometer is that the inertia of the mechanical mechanism must be overcome. The weather vane device requires a very free gimbal so as to allow the device to point accurately into the wind at very low wind speeds. As a result of its reliance on this mechanical element, the anemometer is not conducive to measuring gusts, and is subject to errors in measurement due to overshoot, oscillations that occur due to change in wind direction, and wind measurement even when the wind is not blowing.

Still another type, a sonic anemometer uses sound waves to measure wind direction and speed. These are a class of instruments that are typically used by research and other scientific organizations. These systems use the changes in the speed of sound as measure over a finite path. Whilst these instruments overcome the failings of the more prevalent cup and vane they cost considerably more to purchase and maintain. Also, the sonic devices tend to be very power hungry, so although suitable for unattended operation, considerable cost and compensatory mechanisms must be built into the device for continuous remote operation.

Other force sensing vertical rod type anemometers are known. In one example Shoemaker (U.S. Pat. No. 7,117,735) uses a simple, single pickup wind drag force measurement system. Therefore, although addressing the cost threshold, the accuracy of measurement is modest. Moreover, the device is sensitive to inclinations of the base, and has no built in device as a compensatory mechanism for correcting the inaccuracies that would result.

Another vertical shaft sensor design, Gerardi (U.S. Pat. No. 5,117,687) uses a sphere attached to a shaft. When the wind force moves the shaft, electromagnetic or optical sensors detect the deflection from the neutral position. The air data sensor uses a relative difference method to measure deflection using four orthogonally placed sensors in addition to two more sensors for complete 3-axis velocity measurements. One drawback to this design is the excessive use of strain gauges contributing to the overall complexity of the design. Moreover, this invention requires a counterweight to function in an inclination independent manner.

Portable wind sensors typically involve a weather vane structure that points a fan-based anemometer in the direction of the wind to measure wind speed. Other types require the operator to point a fan-based anemometer into the wind. These are generally unsuitable for unattended operation, suffering from inaccuracies in measurement and are generally less sensitive than more expensive designs.

SUMMARY OF THE INVENTION

One embodiment of the present invention is directed to an anemometer assembly that is a combined wind speed and wind direction sensor and radio antenna. A wind sensor measures relative wind speed and wind direction without the use of moving parts and consumes very little power making it suitable for unattended operation. The main wind sensor is an elongated vertical member that can be used as radio antenna datalink. Data generated from the wind sensor can be transmitted from a remote location and relayed to a central collection point or network location.

The anemometer assembly measures the velocity and direction of wind flowing over a surface of interest and includes a sensor plate, an elongated vertical member, and a plurality of load sensors. The sensor plate is supported by the load sensors placed, in one configuration, at 90 degrees to each other. The elongated vertical member extends perpendicularly from the sensor plate, and has a means of connecting to a surface, preferably from the center of the sensor plate. The sensor plate is preferably made from a variety of rigid but lightweight materials, such, but not limited to, aluminum or composite carbon fiber.

Opposing load sensors form two legs of a Wheatstone bridge circuit. The load sensors are configured so that wind speed and wind direction is determined by the amount of load difference between opposing load sensors when the elongated vertical member is deflected due to wind loading. The load sensors can be any number of compression sensor gauges as known in the art.

In accordance with other aspects of the invention, the elongated vertical member is insulated from the base by a bushing to allow the elongated vertical member to be used as a vertical antenna for a transmitter or transceiver for a datalink radio. The elongated vertical member can be made from a variety of materials, for example, but not limited to stainless steel or copper. The elongated vertical member can be telescopic, fixed and detachable, and/or segmented so as to ease transport and portability.

In accordance with still other aspects of the invention, a tilt sensor is positioned on the sensor plate to measure deviation of the elongated vertical member from true vertical for the installation and compensation of the load sensor measurements. Measurements from the tilt sensor can be used to mathematically compensate and correct for deviations of the anemometer assembly, and by extension the elongated vertical member housed therein, from a true vertical position. As a result, counterpoising mechanisms are not necessary, and the sensor plate does not have to be perfectly level when in operation.

In accordance with still other aspects of the invention, an antenna lead connects the elongated vertical member to a datalink radio that can link to a remote computer system. The data can be transmitted to a remote location where it can reduce the raw data from the load sensors to calculate wind velocity and wind direction.

BRIEF DESCRIPTION OF THE DRAWINGS

Preferred and alternative examples of the present invention are described in detail below with reference to the following drawings:

FIG. 1-2 is a schematic top view of a tilt sensor;

FIGS. 1-3 and 1-4 are schematic drawings of two sets of exemplary strain gauges for X and Y axes configured in Wheatstone bridges;

FIG. 2 is a cross-sectional and front view of an exemplary embodiment of the present invention; and FIG. 3 is a flow diagram of an exemplary embodiment of a wind movement measuring and data transmitting method performed by the system shown in FIG. 1.

DETAILED DESCRIPTION OF THE PREFERRED EMBODIMENT

Figure 1:
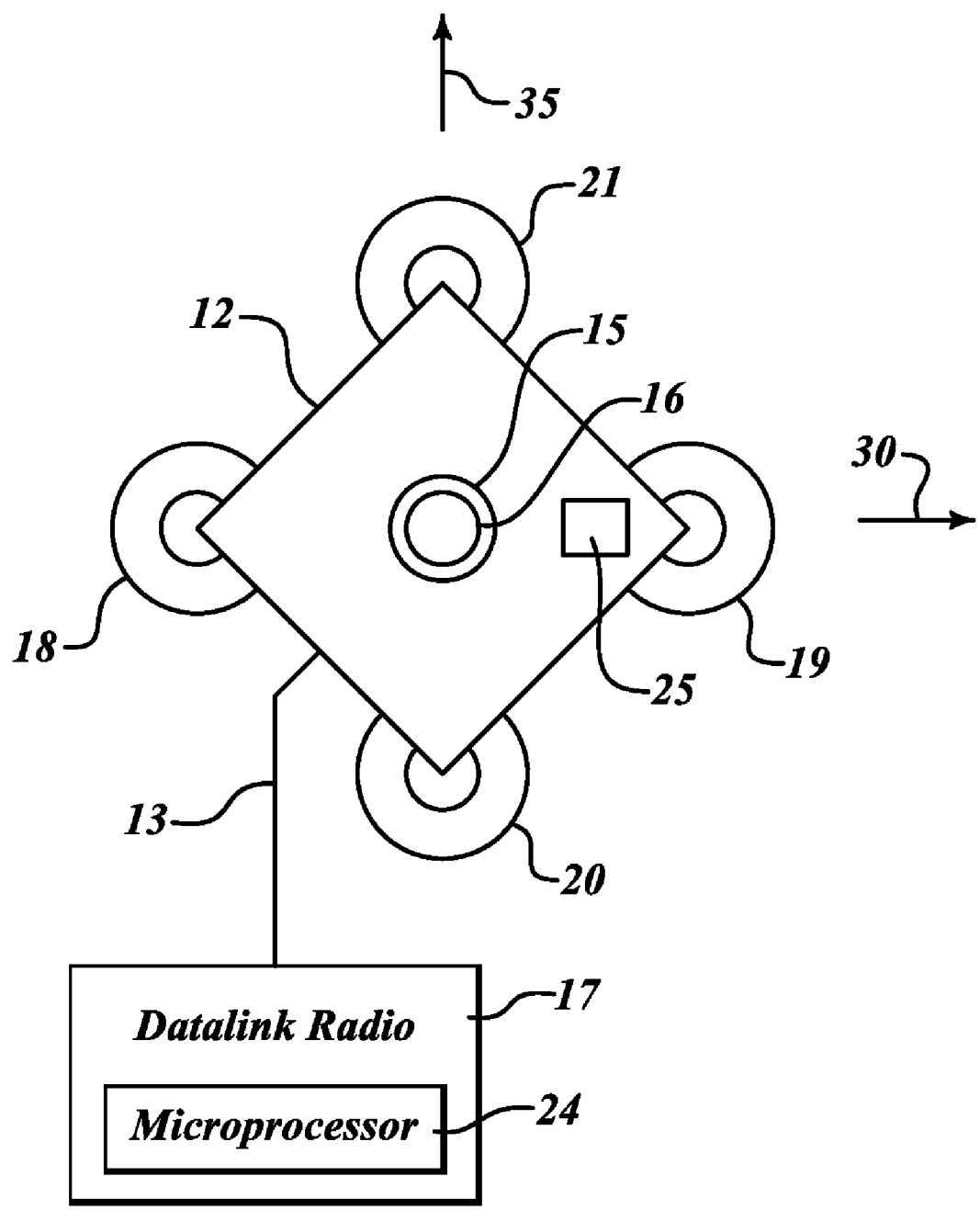
FIG. 1-1 is a schematic top view illustrating the orientation of the sensors of the anemometer assembly of one embodiment of the present invention.
Figures 1, 2:
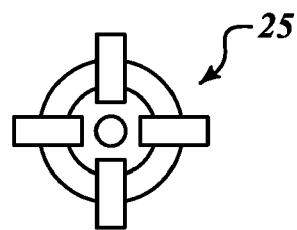

FIG. 1-1 and FIG. 1-2 shows a schematic top view of an exemplary embodiment of a an anemometer assembly 10 of the present invention, that includes a plurality of opposing load sensors 18 and 19 located on an X-axis 30, and load sensors 20 and 21 located on an Y-axis 30, a sensor plate 12; a main wind sensor that is an elongated vertical member/antenna 16; an insulating bushing 15, an antenna lead 13, a tilt sensor 25 (FIG. 1-2), and a datalink radio 17 having a microprocessor 24. The tilt sensor 25 (FIG. 1-2) is positioned on the sensor plate 12 to detect the angle of inclination of the device and generate correction data. The load sensors 18-21 are connect at corners of the sensor plate 20 and a base structure (FIG. 2). The load sensors 18-21 are in signal communication with the datalink radio 17.

The sensor plate 12 is mounted on top of the plurality of load sensors 18, 19, 20, 21 preferably at 90 degree angles to each other, each load sensor 18, 19, 20, 21 positioned at a corner of the sensor plate 12, each load sensor 18, 19, 20, 21 is positioned to sense a load in a direction unique from that of the other. Opposing load sensors 18 and 19, in this example, are along the X axis 30 in relationship to the sensor plate 12; and opposing load sensors 20 and 21 are located along a Y axis 35. Each load sensor 18, 19, 20, 21 makes indirect contact with the elongated vertical member 16 through the sensor plate 12. Each load sensor 18, 19, 20, 21 detects and measures a load force associated with deflections of the elongated vertical member 16 due to wind impinging on it and transmits any such measured deflection data to the datalink radio 17 where it is processed in microprocessor 24 to determine relative wind direction and wind speed.

The elongated vertical member 16 is also a radio antenna for transmitting wind data to a data collection point 26. The wind data calculated by microprocessor 24 is transmitted to the data collection point 26 by antenna 16 using datalink radio 17. The datalink radio can be any type of radio that is capable of transmitting data, such as a WiMax radio. The elongated vertical member 16 is substantially freestanding and designed to be physically deflected in the direction of any wind flow when placed in such a wind flow stream. The amount of deflection is proportional and directional to the velocity and direction of any such wind flow. The insulating bushing 15, positioned at an opening in the sensor plate 12, insulates the elongated vertical member 16 from the sensor plate 12 allowing the elongated vertical member 16 to transmit radio signals without interference. The elongated vertical member 16 is secured to the insulating bushing 15 and the insulated bushing 15 is secured to the sensor plate 12. The antenna lead 13 connects the elongated vertical member/antenna 16 to the datalink radio 17.

The microprocessor 24 converts load sensor 18-21 voltage to wind speed in each axis. The wind speed in each axis is corrected for forces due to tilt of the sensor plate 12 by using the tilt signals received from tilt sensor 25. The corrected wind speed in each axis is then converted to resultant relative wind speed and wind direction by addition of the two wind vectors. The microprocessor 24 then formats the calculated wind speed and wind direction data and sends it to a datalink radio 17 where it is transmitted to a data collection point 26 using antenna 16 (FIG. 2).

The data collection point 26 (FIG. 2) includes a means to store wind data for later analysis. This could by any common type of computer attached to a suitable datalink receiver.

The tilt sensor 25 (FIGS. 1-2, 2) produces tilt data that is used to correct for variations in inclination of the anemometer assembly 10, and accurately calibrate the force on the elongated vertical member 16. For example, a semi-conductor MEMS (micro electronic machined semiconductor) device or electrolytic tilt sensor (e.g. TrueTilt products from the Fredericks Company) can be used to provide for the correction details. The force due to inclination of elongated vertical member 16 from true vertical acts as if the mass of elongated vertical member 16 is located at the midpoint of the element. The force on the sensor plate 12 due to inclination from vertical is equal to the Sine of the angle of inclination from vertical multiplied by the length of elongated vertical member 16 divided by the distance between opposing load cells. To correct for inclination errors, this force is subtracted from the measured force due to wind to determine the true wind induced force on elongated vertical member 16.

Turning to back to FIG. 1-1 and referring to FIGS. 1-3 and 1-4, opposing load sensors 18 and 19, 20 and 21 form two legs of a Wheatstone bridge circuit. In one preferred orientation of the load sensors 18, 19, 20, 21 is at 90 degree angles apart from each other to provide orthogonal force measurements that can be used with vector analysis to determine wind direction. The total force applied to the elongated vertical member 16 can be resolved by vector addition of the individual component forces.

Figures 1, 2, 3:
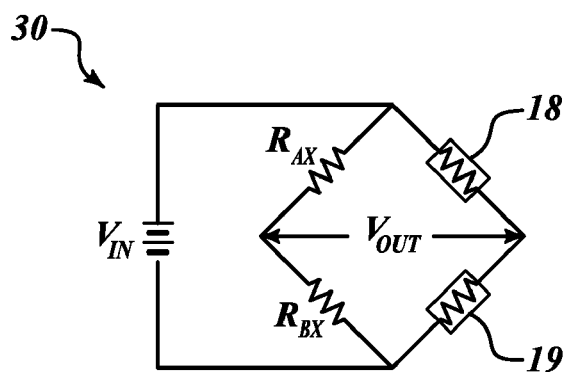
Figures 1, 2, 3, 4:
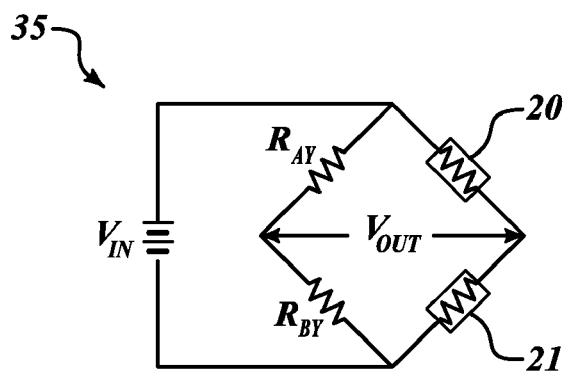
Figure 2:
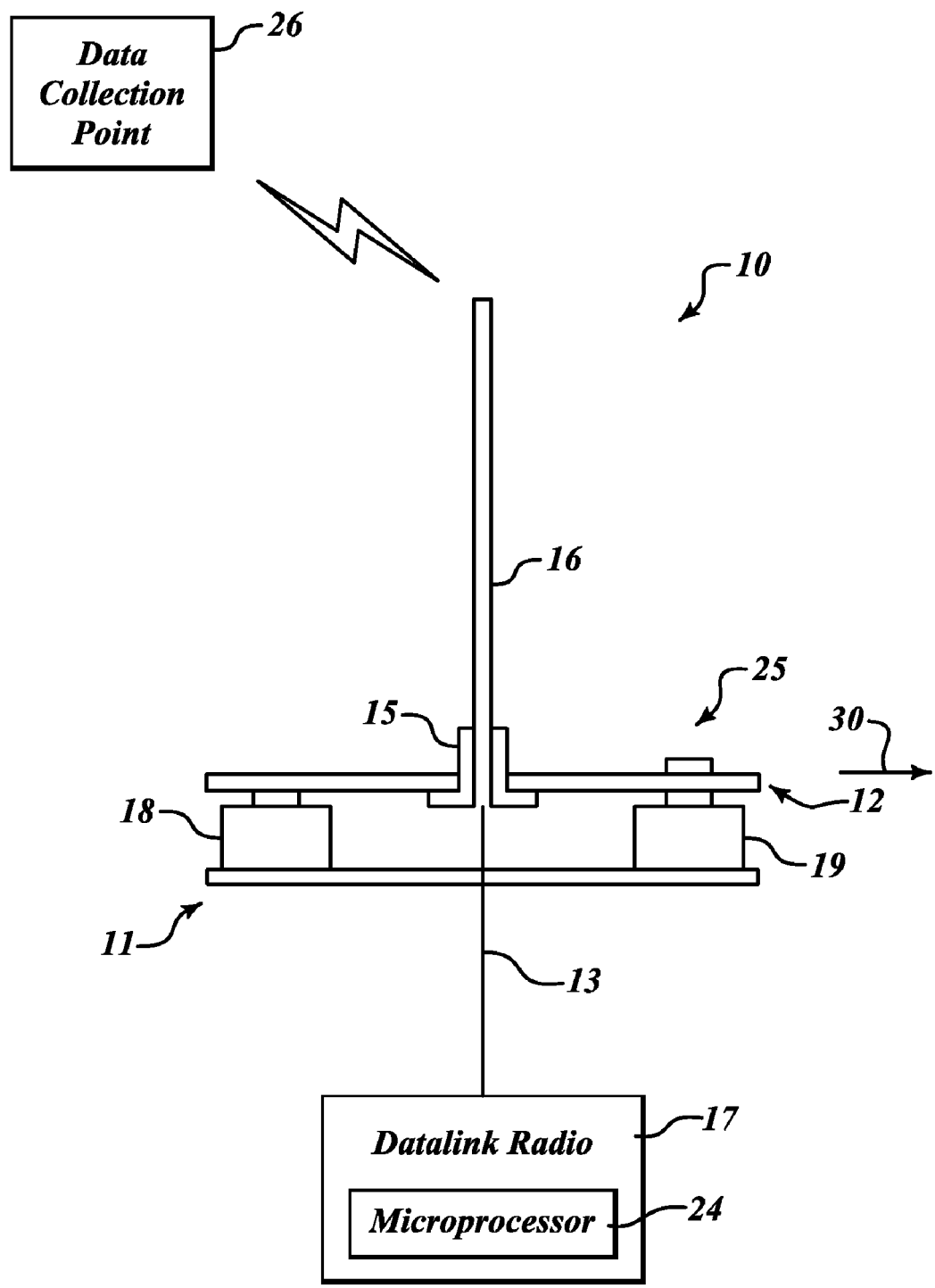
Figure 3:
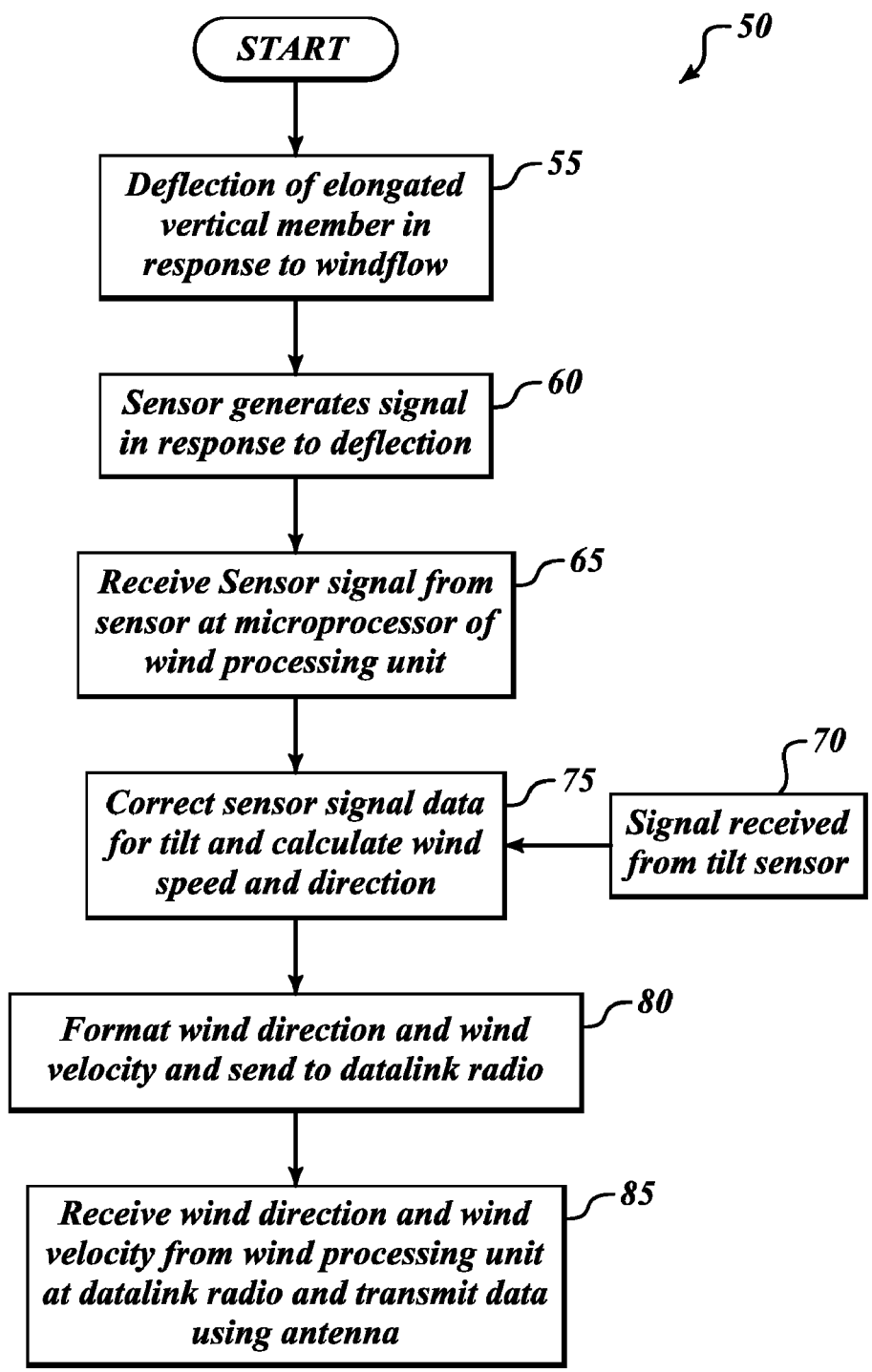

In FIG. 1-3, a first Wheatstone bridge circuit 18-19 includes a high side of an input voltage $V_{IN}$ is connected to a first side of the first load cell $18^{-L}$ and resistor $R_{AX}$. The low side $V_{IN}$ is connected to a first side of a second load cell $19^{-L}$ and resistor $R_{BX}$. A voltage out $V_{OUT}$ is sampled across a node of the second sides of $R_{AX}$ and $R_{BX}$ and a node of the second sides of the load cells $18^{-L}$, $19^{-L}$. A change in the resistance value of the load cells $18^{-L}$, $19^{-L}$ correlates to an applied strain. Because the orthogonal wind axis, i.e. axis along which the wind is blowing, can act as a pivot point, the particular load cells used for this application preferably respond to both tensile and compressive forces.

For example, the standard arrangements as shown in the schematic diagrams FIGS. 1-3 and 1-4, can have two resistive strain gauges and two fixed or unstrained resistors to measure aerodynamic forces in each in each of the two orthogonal directions ϵTx is the total strain in along the X axis 30, and ϵTy is the total strain along the Y axis 35. Total strain for each of the two orthogonal directions can be given by the equations:

$$\epsilon Tx = \epsilon RAx - \epsilon rBx + \epsilon R18 - \epsilon R19 \quad (1)$$

$$\epsilon Ty = \epsilon RAy - \epsilon rBy + \epsilon R20 - \epsilon R21 \quad (2)$$

Where ϵTx=total strain in the x direction;
ϵTy=total strain in the y direction
ϵRAx=total strain on resistor Ax in the x direction
ϵRAy=total strain on resistor Ay in the y direction
ϵRBx=total strain on resistor Bx in the x direction
ϵRBy=total strain on resistor By in the y direction
ϵR18=strain on element 18 in the x direction
ϵR19=strain on element 19 in the x direction
ϵR20=strain on element 20 in the y direction
ϵR21=strain on element 21 in the y direction
Ax, Ay, Bx and By are fixed resistors or unstrained resistance strain gauges.

Signals generated by the load sensors 18, 19, 20, 21 include, for example, static strain due to the drag of the elongated vertical member 16 and are proportional to the square of the wind velocity. The generated signals from the load sensors 18, 19, 20, 21 are sent to the microprocessor 24. The microprocessor 24 simultaneously receives the generated signals from at least two load sensors 18, 19, 20, 21. Inclination of sensor plate 12 from perfectly flat introduces load signal in load sensors 18, 19, 20, and 21 that would appear as wind if not corrected for. Inclination of sensor plate 12 is measured by tilt sensor 25. The tilt data generated by tilt sensor 25 is used by microprocessor 24 to correct the force measurements from load sensors 18, 19, 20, and 21 for errors due to inclination of the base plate. The tilt sensor can be calibrated prior to operation if it is not self calibrating. A correction coefficient relating tilt angle to force on the load sensors (18, 19, 20, 21) is dependent on the height and weight of vertical member 16.

In a preferred embodiment rigid material is used for the elongated vertical member 16 providing for simple moment arm calculations (i.e. moment calculated by force multiplied by the lever arm length) to establish the correction factor for tilt. If, for example, the elongated vertical member 16 can bend substantially in the wind because of inherent flexibility, calculation of wind velocity becomes significantly more complex, as the moment arm of the sensor element is no longer a second-order function of wind velocity at high wind speeds. A vector wind speed algorithm, for example as discussed above (See Equations 1 and 2), is carried out by a microprocessor 24 (FIG. 2) to solve the load force equation for velocity in each axis 30, 35, applying the proper calibration coefficients to the drag for (as described in Equation 3) and tilt sensor 25 (FIGS. 1-2, 2) data. The microprocessor 24 corrects the load sensor voltage data for tilt and converts the corrected load sensor voltage data to wind speed along each axis. Wind speed in each axis is then converted to resultant wind speed and relative wind direction. The wind direction and wind speed is then formatted by microprocessor 24 and sent to datalink radio 17 for transmission.

FIG. 2 is a cross-sectional view of an anemometer assembly 10 along an X-axis 30, showing two opposing load sensors 18, 19, a rigid mounting platform 11, the sensor plate 12, and further incorporating some of the features of the present invention.

The anemometer assembly 10 as described above, measures the wind speed or velocity and wind direction of wind flowing over a surface and includes the sensor plate 12 having a means, such as an opening, for being connected to the elongated vertical member 16. The sensor plate opening in conjunction with the insulating bushing 15 is a means of securing the elongated vertical member substantially perpendicularly within any such wind flow. The elongated vertical member 16 is connected to and extends perpendicularly through the sensor plate 12, through the insulating bushing 15, connecting with the antenna lead 13 and the datalink radio 17.

The four load sensors 18-21 are mounted on a rigid platform 11. The rigid platform 11 and the sensor plate 12 are separated by a gap, such that the rigid platform is parallel to and underneath to the sensor plate 12. The elongated vertical member 16 is secured to the rigid platform and extends substantially perpendicularly from the rigid platform with the elongated vertical member being substantially freestanding and designed to be physically deflected when placed in a wind flow. The antenna lead is substantially protected from wind disturbance by its position within the space between the sensor plate 12 and the rigid platform 11.

The elongated vertical member 16 is preferably made of stainless steel or some other suitably rigid, conductive material with a height between approximately 14 inches to 36 inches and a ratio of height to diameter of approximately 30:1 for sensing wind speeds from approximately 10-120 mph. The dimensions of the elongated vertical member 16 are chosen to optimize the range of wind speeds detectable. For example if the elongated vertical member 16 is too long and/or too thin it will not withstand strong winds. On the other hand if the elongated vertical member 16 is too thin and/or too short it will not be responsive to low wind velocities. With these considerations in mind, the elongated vertical member 16 is selected to provide a desirable range of strain values. Preferably an elongated vertical member 16 will be in the range of 0.35-0.75 inches in diameter.

The force (F) acting on the elongated vertical member 16 is proportional to the square of the wind speed (V); signal generated from the load sensors increases with increased wind velocity. By measuring force (F) while knowing the other parameters (including the dimensions of the elongated vertical member 16, the velocity is derived by the equation:

$$V = [2F/C_d \rho l d]^{1/2} \tag{3}$$

where $C_d$ is the drag coefficient of the elongated vertical member; $\rho$ is the density of the fluid (air), l and d are the length and diameter of the elongated vertical member, and V is the free stream velocity of the wind. Because the force due to the wind on the mounted elongated vertical member 16 is measured in two axes (X 30 and Y 35), the anemometer assembly 10 measures the vector components of the local wind. Therefore using a rectangular to polar coordinate system conversion, both wind speed and wind direction can be inferred.

Turning to FIG. 3 a flow chart illustrates a wind movement measuring and data transmitting method 50 as practiced according to one embodiment of the invention. In operation at a Block 55 a flow of air creates force against the elongated vertical member 16 causing deflection of the elongated vertical member 16. Next at a Block 60, opposing load sensors 18, 19, 20, 21 (FIG. 1-1) detect the physical deflection of an elongated vertical member 16 in the direction of any wind flow and generate a signal in response to the deflection. The amount of deflection is proportional and directional to the velocity and direction of any such wind flow. Next at a Block 65, a signal proportional to the amount of deflection induced strain it generated by the load sensor and is transmitted to and received by a microprocessor 24: the microprocessor 24 is capable of simultaneously receiving and integrating information input from all load sensors 18, 19, 20, 21 (FIG. 1-1), in addition to signals generated from the tilt sensor 25 at a Block 70. At a Block 75, the microprocessor 24 corrects the load sensor data for tilt and calculates the wind speed and relative wind direction. At Block 80, the wind speed and direction data is formatted and sent to the datalink radio.

At a Block 85, the formatted wind speed and wind direction data is transmitted to data collection point 26 which includes a means to store the wind data. The weather sensor data from the elongated vertical member 16 and tilt sensor 25 can then be presented to the end user at the data collection point 26, which can be, for example, a handheld WiMax® enabled device, which can present the weather data on a display.

While the preferred embodiment of the invention has been illustrated and described, as noted above, many changes can be made without departing from the spirit and scope of the invention. For example simple software modifications enable this, allowing for updates to keep this invention useful for the foreseeable future; and a wide variety of materials can be used for the component parts and a variety of load cells and tilt sensors can be used without departing from the spirit of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A wind direction and velocity sensor comprising:
   a rigid mounting platform;
   an elongated vertical member;
   a sensor plate spaced apart from said rigid platform, the sensor plate having an opening, a bushing being received in the opening, wherein the elongated vertical member extends through the sensor plate opening and through the bushing;
   a tilt sensor attached to the sensor plate;
   a plurality of load sensors positioned substantially beneath and in contact with the sensor plate, each load sensor configured to sense a load caused motion of the sensor plate due to movement of the elongated vertical member;
   a component configured to receive signals from at least two load sensors;
   a component configured to calculate wind data from the received signals; and
   a component configured to transmit formatted wind data to a data collection point.

2. The wind direction and velocity sensor of claim 1, further comprising a component configured to collect the wind speed and wind direction of any wind flow.

3. The wind direction and velocity sensor of claim 2, further comprising a component configured to process formatted wind data that is a hand-held personal digital assistant.

4. The wind direction and velocity sensor of claim 1, wherein the plurality of load sensors comprises four load sensors positioned at 90 degree angles to each other, each load sensor having contact with the elongated vertical member through the sensor plate.

5. The wind direction and velocity sensor of claim 1, wherein the component configured to transmit the formatted wind data to the data collection point is a datalink radio in contact with the elongated vertical member that is a radio antenna.

6. The wind movement measuring and data transmitting apparatus of claim 5, wherein the plurality of load sensors comprises four load sensors positioned at 90 degree angles to each other, each load sensor having contact with the elongated vertical member through the sensor plate.

7. The wind movement measuring and data transmitting apparatus of claim 5, wherein the means of transmitting the data to the data collection point is the elongated vertical member that is a radio antenna.

8. The wind movement measuring and data transmitting method of claim 7, wherein detecting and measuring the amount and direction of any deflection in the elongated vertical member is by positioned load sensors wherein four load sensors are positioned at 90 degree angles to each other, each load sensor having contact with the elongated vertical member through the sensor plate.

9. The wind movement measuring and data transmitting method of claim 7, wherein detecting and correction for the inclination of anemometer assembly and the deviation of elongated vertical member from a true vertical position is by a tilt sensor mounted onto the sensor plate, and calculating wind direction and wind speed including means to adjust the deflection data.

10. The wind movement measuring and data transmitting method of claim 7, wherein transmitting measured wind data to the data collection point is by the elongated vertical member that is a radio antenna.

11. The wind movement measuring and data transmitting method of claim 7, wherein transmitting calculated wind data to the data collection point is by the elongated vertical member that is a sizably adjustable radio antenna.

12. The wind movement measuring and data transmitting apparatus of claim 5, wherein the means of transmitting the data to the data collection point is the elongated vertical member that is a sizably adjustable radio antenna.

13. The wind direction and velocity sensor of claim 1, wherein the component configured to transmit the formatted wind data to the data collection point is a datalink radio in contact with the elongated vertical member that is a sizably adjustable radio antenna.

14. A wind movement measuring and data transmitting apparatus comprising:
   an elongated vertical member being substantially freestanding and designed to be physically deflected in the direction of any wind flow when placed in such a wind flow, the amount of deflection being proportional and directional to the velocity and direction of any such wind flow;
   means of securing the elongated vertical member substantially perpendicularly in contact with a sensor plate within any such wind flow;
   means of locating a plurality of load sensors in proximity to the elongated vertical member, each load sensor being at a known angle to at least one other said load sensor, and each load sensor having contact with the elongated vertical member, each load sensor including means of detecting and measuring the amount and direction of any deflection in the elongated vertical member;
   means of simultaneously receiving any such measured deflection data from at least two said load sensors;
   means of processing wind speed and wind direction from measured deflection data including correcting for the angle of inclination of the anemometer assembly and deviation of the elongated vertical member from a true vertical position;
   means of formatting calculated wind speed and wind direction data for transmission to a data collection point; and
   means of transmitting formatted wind speed and wind direction to a data collection point by means of a datalink radio.

15. A wind movement measuring and data transmitting method comprising:
   detecting the physical deflection of an elongated vertical member in the direction of any wind flow when placed in such a wind flow, wherein the amount of deflection is proportional and directional to the velocity and direction of any such wind flow;
   generating a plurality of load sensor signals proportional to deflection in the elongated vertical member by positioned load sensors, each load sensor having contact with the elongated vertical member through a sensor plate;
   receiving the plurality of load sensors signals proportional to the measured deflection data from each and at least two load sensors;
   receiving a correction signal from a tilt sensor corresponding to the inclination of the elongated vertical member from a true vertical position;
   calculating wind direction and wind speed based on the data from the plurality of load sensor signals corresponding to the measured deflection data from at least two said load sensors, and tilt correction signals from the tilt sensor;

formatting the calculated wind direction and wind speed data for transmission by a datalink radio to a data collection point; and receiving any such formatted wind direction and wind speed data and receiving formatted wind direction and wind speed data at a data collection point.

* * * * *